US012565317B2

(12) United States Patent
Acharya et al.

(10) Patent No.: US 12,565,317 B2
(45) Date of Patent: Mar. 3, 2026

(54) HELICAL CONNECTING LINK AND METHOD FOR ENERGY ABSORPTION USING THE SAME

(71) Applicant: B/E Aerospace, Inc., Winston-Salem, NC (US)

(72) Inventors: Pradeep Acharya, Bangalore (IN); Sreekanth Rao, Bangalore (IN); Maxime Dempah, Atlanta, GA (US)

(73) Assignee: B/E Aerospace, INc., Winston-Salem, NC (US)

( * ) Notice: Subject to any disclaimer, the term of this patent is extended or adjusted under 35 U.S.C. 154(b) by 404 days.

(21) Appl. No.: 18/199,132

(22) Filed: May 18, 2023

(65) Prior Publication Data

US 2024/0043121 A1 Feb. 8, 2024

(30) Foreign Application Priority Data

Aug. 4, 2022 (IN) .............................. 202241044594

(51) Int. Cl.
*B64D 11/06* (2006.01)
*F16F 7/12* (2006.01)
(52) U.S. Cl.
CPC ...... *B64D 11/0619* (2014.12); *B64D 11/0648* (2014.12)
(58) Field of Classification Search
CPC .... B64D 11/0619; B64D 11/0648; F16F 7/12; F16F 7/121
USPC ....................................................... 298/681
See application file for complete search history.

(56) References Cited

U.S. PATENT DOCUMENTS

| | | | |
|---|---|---|---|
| 3,493,082 A * | 2/1970 | Bell | B64C 25/001 188/377 |
| 3,582,133 A | 6/1971 | Delavenne | |
| 5,927,646 A * | 7/1999 | Sandy | F16F 7/121 244/108 |
| 6,776,370 B2 * | 8/2004 | Struzik | B64C 27/001 244/17.27 |
| 7,393,167 B2 | 7/2008 | Dowty et al. | |
| 8,192,102 B2 * | 6/2012 | Heidari | F16B 5/0258 411/10 |

(Continued)

FOREIGN PATENT DOCUMENTS

| | | |
|---|---|---|
| EP | 2342475 A1 | 7/2011 |
| EP | 3310612 A4 | 3/2019 |
| WO | 199905553 A1 | 11/1999 |

OTHER PUBLICATIONS

Extended European Search Report dated Dec. 13, 2023; European Application No. 23189540.0.

(Continued)

*Primary Examiner* — Thomas W Irvin
(74) *Attorney, Agent, or Firm* — Suiter Swantz IP

(57) ABSTRACT

A connecting link for connecting first and second components such as an aircraft seat leg and a track fastener. The link includes a helical middle portion forming an interior space in which an energy attenuator is positioned. In embodiments, the energy attenuator includes inner and outer cylindrical bodies that operate in translation upon a deformation of a lattice structure configured to deform when at least one of a compressive threshold and a tensive threshold is met. In embodiments, the energy attenuator receives part of one of the first and second components. The connecting link may be manufactured by an additive manufacturing process and used in an aircraft leg assembly to save weight and absorb impact energy on the leg.

19 Claims, 6 Drawing Sheets

(56)                 References Cited

U.S. PATENT DOCUMENTS

| 8,281,599 | B2 * | 10/2012 | Even | F02K 9/97 |
| | | | | 60/770 |
| 8,991,569 | B1 | 3/2015 | Lou et al. | |
| 9,221,361 | B1 | 12/2015 | Platt et al. | |
| 9,283,874 | B2 | 3/2016 | Mindel et al. | |
| 9,981,574 | B2 | 5/2018 | Olivares | |
| 10,052,984 | B1 | 8/2018 | Bosen et al. | |
| 10,166,889 | B1 | 1/2019 | Lou et al. | |
| 10,259,583 | B2 * | 4/2019 | Schmeer | B64D 11/0619 |
| 10,427,564 | B2 * | 10/2019 | Mindel | B60N 2/42736 |
| 10,479,507 | B2 * | 11/2019 | Rebmann | B64D 11/0619 |
| 10,494,111 | B2 * | 12/2019 | Bozon | F16F 15/08 |
| 12,233,762 | B2 * | 2/2025 | Hasan | B60N 2/42709 |
| 2010/0129137 | A1 * | 5/2010 | Heidari | F16F 7/12 |
| | | | | 29/700 |

OTHER PUBLICATIONS

Grainger, Motion Control Coupling, https://www.grainger.com/product/2ARC4?ef_id=EAIaIQobChMImcLIn8Ov-AIVgwnnCh3B5gbWEAKYASABEgLKXID_BwE:G:s&s_kwcid=AL!2966!3!496359977500!!!g!1663126339581!&gucid=N:N:PS:Paid:GGL:CSM-2295:4P7A1P:20501231&gcIid=EAIaIQobChMImcLIn8Ov-AIVgwnnCh3B5gbWEAkYASABEgLKXfD_BwE&gcIsrc=aw.ds.
MW Components, A and H Series Flexible Beam Couplings, https://www.mwcomponents.com/a-and-h-series-flexible-beam-couplings.

* cited by examiner

800

806

802

812

804

808

810

802

804

HELICAL CONNECTING LINK AND METHOD FOR ENERGY ABSORPTION USING THE SAME

CROSS-REFERENCE TO RELATED APPLICATION

This nonprovisional application claims the benefit of priority of Indian Patent Application Number 202241044594 filed Aug. 4, 2022 for "HELICAL CON-NECTING LINK AND METHOD FOR ENERGY ABSORPTION USING THE SAME," which is hereby incorporated by reference in its entirety.

TECHNICAL FIELD AND BACKGROUND

The present disclosure relates generally to energy absorbing connecting links, and more particularly to a connecting link including a helical energy attenuation feature configured to perform in a predictable manner during crash loading.

Track fasteners and fittings are used to attach aircraft seat legs to floors, for instance to embedded seat tracks. FIG. 8A shows a non-limiting example of a passenger seat 800 that uses a track fastener 802 for rear leg 804 attachment. FIG. 8B is a detailed view of FIG. 8A showing the rear leg track fastener 802 generally including a machined aluminum body 806, steel studs 808, and steel shear plungers 810. The track fastener 802 attaches to the rear seat leg 804 using a bolt 812 positioned through a swivel joint to rotate about a rotational axis. In use, the steel studs 808 resist vertical loads, the steel shear plungers 810 resist forward (i.e., shear) loads, the swivel joint accommodates floor warpage tolerance to allow approximately ±10-15 Deg roll, and the aluminum body 806 houses all of the components.

Doublers are also commonly used in aircraft seats to attach the rear leg to the track fastener. A conventional doubler 918 generally includes two equal plates 920 positioned on opposing sides of the rear leg 904 and the track fastener 902. In use, the doubler 918 reinforces the interface between the rear leg and the track fastener. Current doublers do not include any provision for absorbing energy. As such, doubles do not limit loads on the seat legs and their failure is unpredictable during crash scenarios.

Therefore, what is needed is an energy absorbing solution that can limit loads on the seat leg by absorbing impact energy by undergoing plastic deformation via a predictable failure mechanism, and which in some embodiments benefits from the advantages of additive manufacturing to reduce overall weight and cost of the seat leg.

BRIEF SUMMARY

Broadly speaking, the present disclosure is directed to energy attenuation connecting links, such as an additively manufactured helical doubler implemented in a seat leg assembly, including a warpage isolation feature configured to fail in a predictable manner under crash loading.

To achieve the foregoing and other advantages, the inventive aspects disclosed herein are directed to a connecting link including a housing having a first axial end portion attachable to a first component, a second axial end portion attachable to a second component, and a helically shaped middle portion extending from the first axial end portion to the second axial end portion and forming an interior space. An energy attenuator is positioned in the interior space formed by the helically shaped middle portion. In use, at least one of the helically shaped middle portion and the energy attenuator is configured to undergo plastic deformation when a threshold force on the connecting link is met.

In some embodiments, the energy attenuator includes an inner cylindrical member extending axially from one end of the first axial end portion, an outer cylindrical member extending axially from one end of the second axial end portion and circumferentially surrounding a portion of the first cylindrical member, and an annular lattice structure positioned between one end of the second cylindrical member and the first axial end portion and circumferentially surrounding a portion of the first cylindrical member.

In some embodiments, the annular lattice structure is configured to compress when a compressive threshold on the connecting link is met and break into at least two parts when a tensive threshold on the connecting link is met, compression or breakage of the annular lattice structure causes relative movement between the first and second cylindrical members, and compression or breakage of the annular lattice structure causes deformation of the helically shaped middle portion.

In some embodiments, deformation of the helically shaped middle portion includes at least one of elongation, contraction, twisting and bending of the helically shaped middle portion.

In some embodiments, an axial passage is formed through the first cylindrical member.

In some embodiments, an interface formed between the inner and outer cylindrical members comprises an annular recess formed in the inner cylindrical member and an annular collar formed on the outer cylindrical member and engaged in the annular recess, wherein when a tensive threshold on the connecting link is met, the annular collar is configured to compress the inner cylindrical member radially inward.

In some embodiments, each of the first and second axial end portions is divided into two leg portions including aligned transverse openings.

In some embodiments, the energy attenuator includes a rectangular cylindrical body configured to receive a portion of the second component.

In some embodiments, the connecting link is manufactured by an additive manufacturing process.

The inventive aspects disclosed herein are further directed to an aircraft seat leg assembly including a leg, a track fastener, and a connecting link connecting the leg to the track fastener. The connecting link includes a housing having a first axial end portion attached to the first component, a second axial end portion attached to the second component, and a helically shaped middle portion extending from the first axial end portion to the second axial end portion and forming an interior space. An energy attenuator is positioned in the interior space, and in use, at least one of the helically shaped middle portion and the energy attenuator is configured to undergo plastic deformation when a threshold force on the connecting link is met.

In some embodiments, the energy attenuator includes an inner cylindrical member extending axially from one end of the first axial end portion, an outer cylindrical member extending axially from one end of the second axial end portion and circumferentially surrounding a portion of the first cylindrical member, and an annular lattice structure positioned between one end of the second cylindrical member and the first axial end portion and circumferentially surrounding a portion of the first cylindrical member. In use, the annular lattice structure is configured to compress when a compressive threshold on the connecting link is met and break into at least two parts when a tensive threshold on the connecting link is met, compression or breakage of the annular lattice structure causes relative movement between the first and second cylindrical members, compression or breakage of the annular lattice structure causes deformation of the helically shaped middle portion, and deformation of the helically shaped middle portion includes at least one of elongation, contraction, twisting and bending of the helically shaped middle portion.

In some embodiments, the energy attenuator is implemented as a cylinder, for instance of rectangular lateral cross section, configured to receive a tang form on the leg.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of energy absorbing connecting links suitable for use in applications such as aircraft passenger seat leg assemblies. In use, the connecting links operate to interconnect components and reduce force on their attached components, such as tensive forces, compression forces, torsion forces and combinations thereof. In use, when a predetermined threshold force is met, such as a threshold force from a high g-force crash event, the connecting links undergo a plastic deformation via a predictable failure mechanism. In embodiments, the failure mechanism may be external on the connecting link, internal to the connecting link or combinations thereof. In embodiments, a first deformable element is implemented as a helical portion of the connecting link and a second deformable element is implemented as a translation mechanism disposed within the helical portion. In some embodiments, the translation mechanism includes a lattice structure configured to deform when the threshold force is met and a component interface continued to deform with continued translation of elements of the connecting link.

Figure 1:
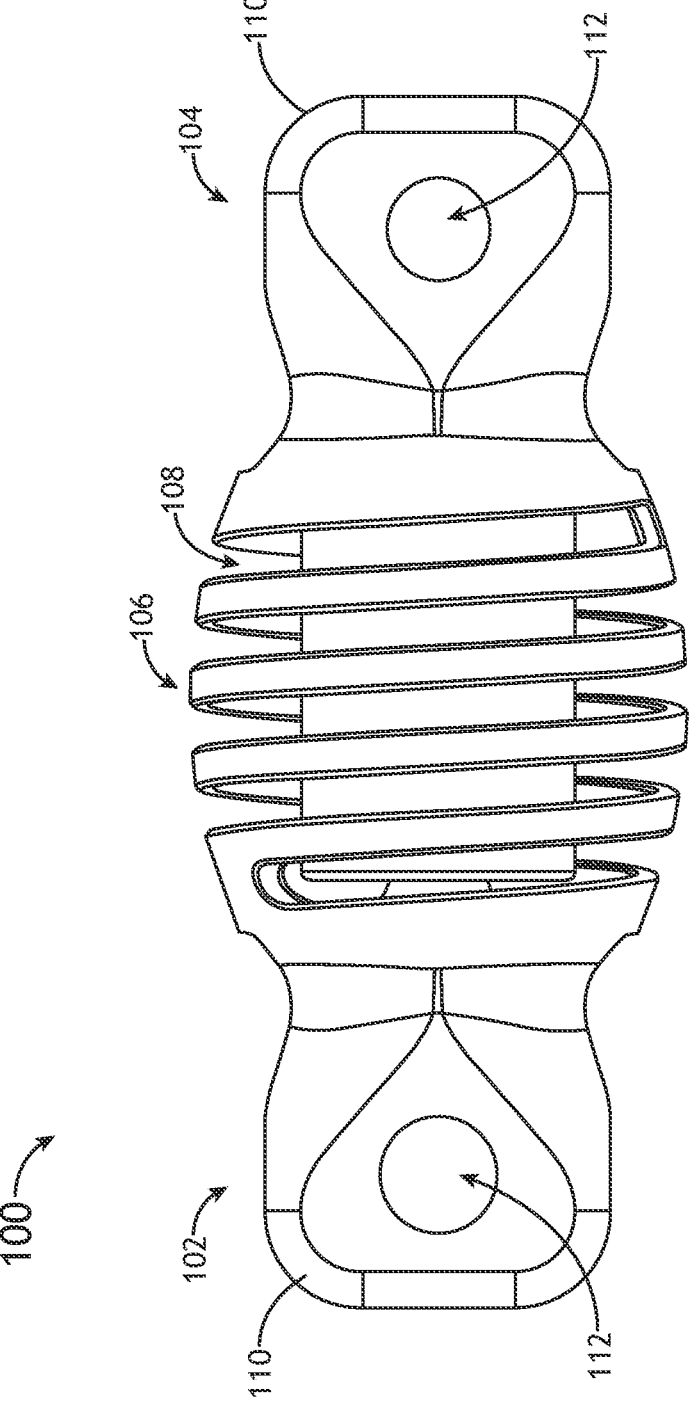
FIG. 1 is a side view of a connecting link according to an embodiment of the present disclosure.

FIG. 1 illustrates a connecting link 100 according to a first embodiment of the present disclosure. The connecting link, also referred to herein as a "doubler" considering particular applications of use, generally includes a first axial end portion 102 configured for attachment to a first component, a second axial end portion 104 configured for attachment to a second component, and a helically shaped middle portion 106 forming an interior space 108. The helically shaped middle portion 106 extends axially between the first and second axial end portions 102, 104. Each of the first and second axial end portions 102, 104 terminates in two legs 110 with each leg forming a transverse through hole 112. The legs 110 are spaced apart to receive the respective component therebetween and the through holes 112 are axially aligned to receive a fastener, such as a bolt or clevis pin, configured to removably attach each end portion to its respective component. In some applications, the axis of the through hole is the rotational axis of the connecting joint.

In use, the helically shaped middle portion 106 is configured to deform to attenuate impact forces on the attached components, for instance impact forces encountered during a crash event, as discussed further below. An energy attenuator positioned in the interior space further operates, in conjunction with or in sequence with deformation of the helical portion, to further attenuate impact forces on the attached components.

Figure 2:
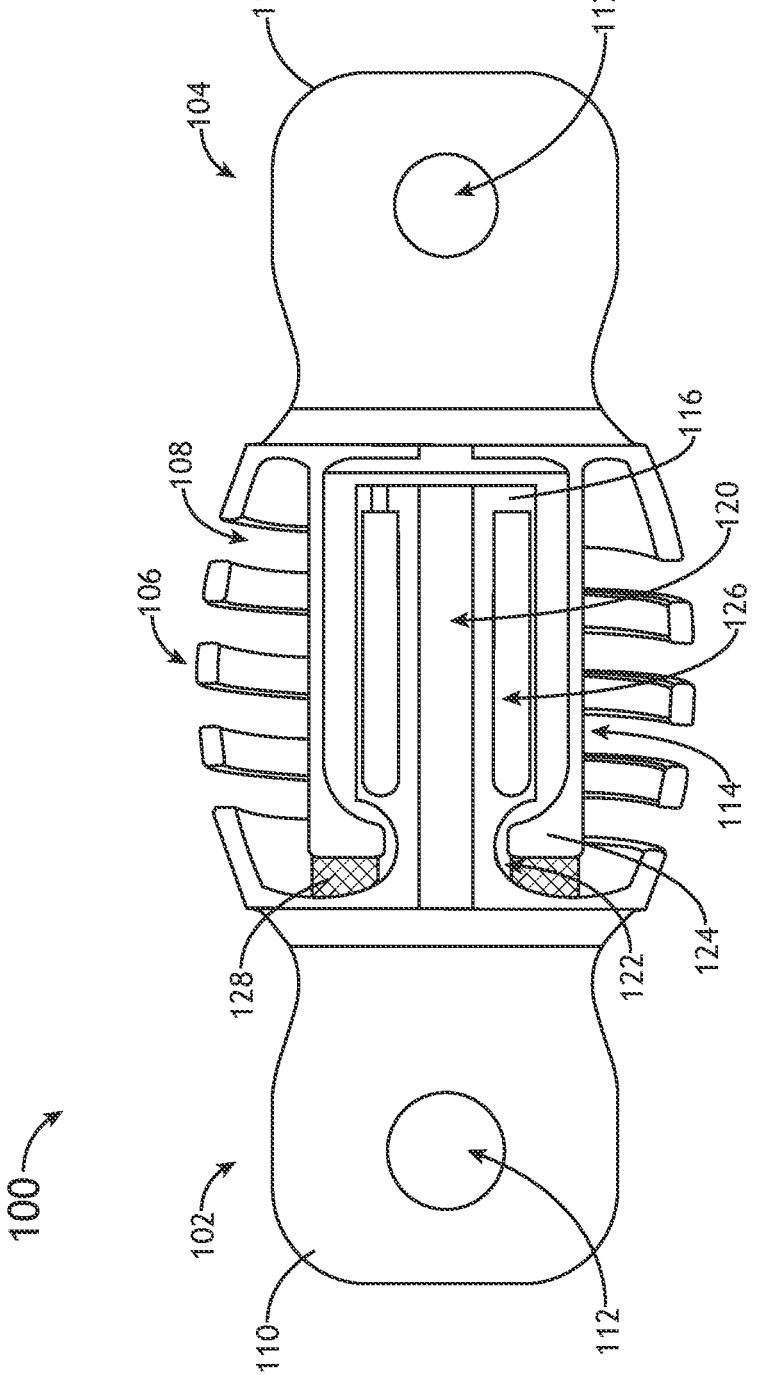
FIG. 2 is a longitudinal cross sectional of the connecting link of FIG. 1.

FIG. 2 illustrates the connecting link 100 including the external energy attenuator formed as the helically shaped middle portion 106, and an internal energy attenuator 114 disposed in the interior space. As shown, the internal energy attenuator 114 extends along the connecting link axis and operates in translational fashion to attenuate impact energy. The internal energy attenuator 114 generally includes an inner cylindrical member 116 attached at one end and extending axially from at interior side of the first axial end portion 102, and an outer cylindrical member 118 attached at one end and extending axially from an interior side of the second axial end portion 104. A portion of the inner cylindrical member 116 is positioned within a portion of the outer cylindrical member 118 with an annular space formed therebetween to allow relative translation between the members under action of the attenuator.

In some embodiments, the inner cylindrical member 116 forms an axial passage 120 open on at least one end configured to evacuate powder as part of an additive manufacturing process of the connecting link 100. In some embodiments, the interface between the inner and outer cylindrical members 116, 118 includes an annular recess 122 formed on an outer surface of the inner cylindrical member proximal to the first axial end 102. The recess 122 receives a shoulder 124 formed on the detached end of the outer cylindrical member 118. Axial material voids 126 formed proximal to the outer surface of the inner cylindrical member 116 allow the outer surface to collapse radially inward during relative translation of the inner and outer cylindrical members. In use, for example, as the first and second axial end portions 102, 104 are moved apart caused by tensive forces acting on the connecting link, the shoulder 124 engages a chamfered end face of the inner cylindrical member 116 positioned inward of the recess 122 thereby driving the thinned walls exterior walls of the inner cylindrical body radially inward.

Figure 3:
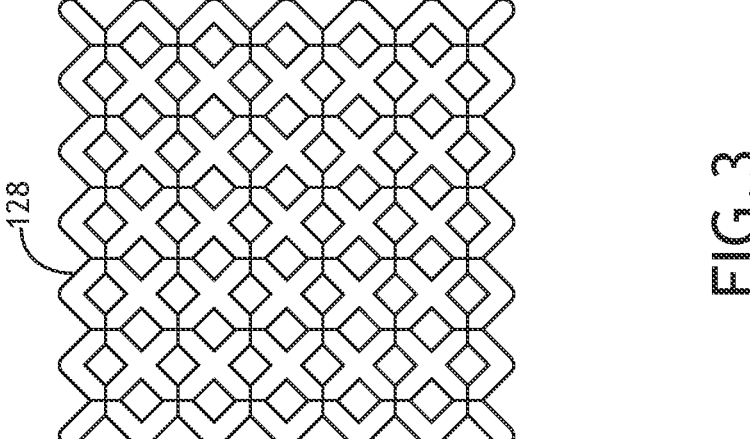
FIG. 3 shows a variable density lattice structure according to an embodiment of the present disclosure.

In some embodiments, a lattice structure 128 (as shown in FIG. 3) is positioned within the interior space 108 captured between the interior face of first axial end 102 and the detached end of the outer cylindrical body 118. The lattice structure 128 circumferentially surrounds a portion of the first cylindrical member 116. In some embodiments, the lattice structure 128 is detached from the surrounding connecting link parts and works in compression. In other embodiments, the lattice structure 128 is attached at one end to the inner face of the first axial end portion 102 and at an opposing end to the detached end of the outer cylindrical member 118. When attached at its opposing ends, the lattice structure 128 acts under tension to break into at least two parts.

FIG. 3 illustrates an exemplary lattice structure 128 according to an embodiment of the present disclosure. In some embodiments, the lattice structure 128 is a variable density lattice structure customizable to absorb impact energy according to, for example, the weight of the coupled component such as the weight of an aircraft passenger seat. For example, a less porous (i.e., denser) lattice structure may be used to support a heavier seat, whereas a more porous (i.e., less dense) lattice structure may be used to support a lighter seat. In use, the lattice structure undergoes a structural change when a predetermined threshold is met. For example, when the threshold is a tensive threshold, the structural change may be breakage and separation of the lattice structure into at least two parts, and when the threshold is a compressive threshold the structural change may be a compression or collapse of the lattice structure with or without breakage. In some embodiments, the lattice structure 128 is made by an additive manufacturing process.

Figure 4:
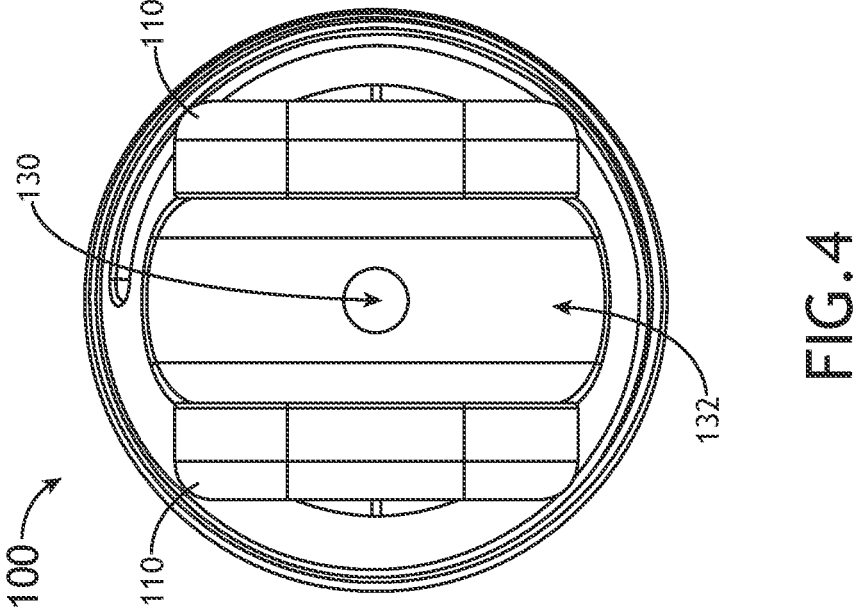
FIG. 4 is an end view of the connecting link of FIG. 1 showing an opening for evacuating material following an additive manufacturing process.

FIG. 4 is an end view of the connecting link 100 illustrating an opening 130 to the axial passage for evacuating material (e.g., powder, wax, etc.) at the completion of an additive manufacturing process. Other openings to axial passages for evacuating powder material may be formed in the connecting link 100, for example, openings to the material voids formed in the inner cylindrical member 116. In some embodiments, the connecting link 100 is a unitary structure made by an additive manufacturing process. Additive manufacturing, also known as 3D printing, is the process whereby physical objects are built layer-by-layer from computer aided designs (CAD). Each layer is built from material deposited on a support and solidified using electromagnetic radiation, such as from a laser or electron beam. The layering process continues until the building process is complete. Advantages of additive manufacturing over conventional building processes include, but are not limited to, lighter weight, strength, durability, faster build times, decreased costs, and the ability to produce precise features and complex geometries. FIG. 4 further illustrates the legs 110 forming a space therebetween for receiving the component to be coupled to the end of the connecting link 100.

Figure 5:
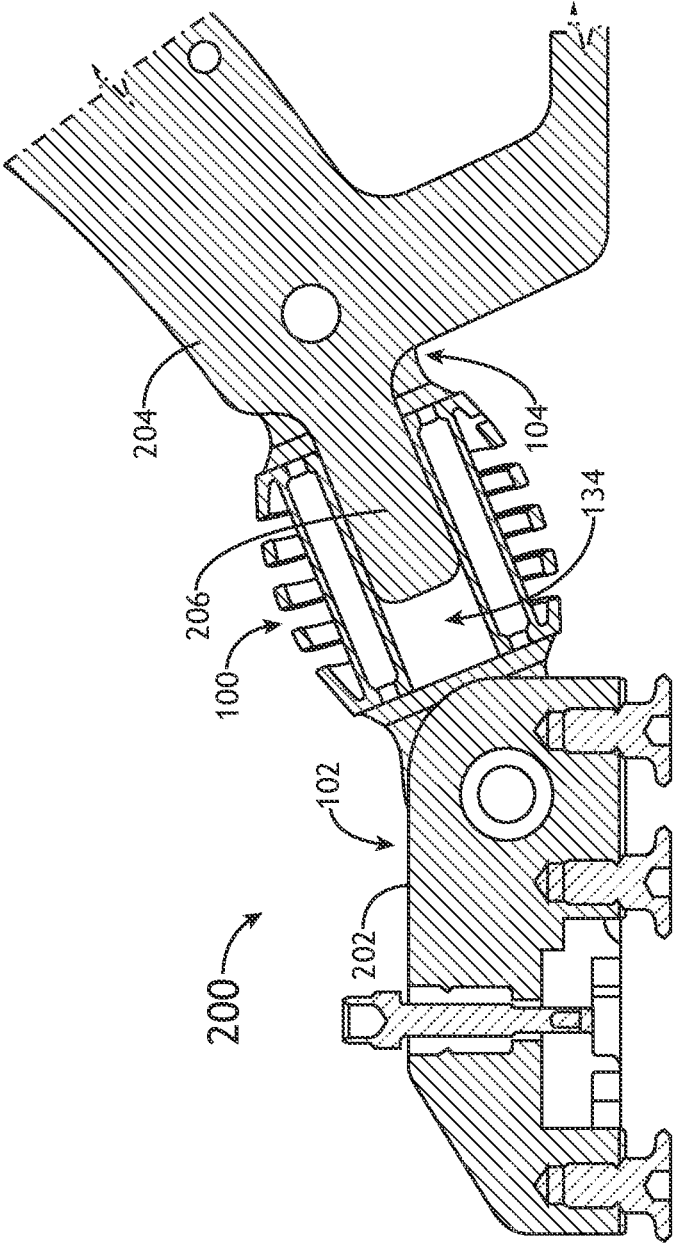
FIG. 5 shows the connecting link according to an embodiment of the present disclosure incorporated in an aircraft seat leg assembly.

FIG. 5 illustrates a application of the connecting link 100 incorporated in a leg assembly, for instance an aircraft seat leg assembly 200. As shown, the connecting link 100 forms a dynamic connection between a track fastener 202 and a rear leg 204. The first axial end 102 of the connecting link 100 is rotatably coupled to the track fastener and the second axial end 104 of the connecting link is coupled to the rear leg 204. The track fastener 202 may be attached using a bolt. In some embodiments, the rear leg 204 forms a tang 206 received in an axial passage 134 formed in the connecting link 100. In some embodiments, the tang 206 allows the leg profile to be shortened and a bolt secures the leg at the second axial end 104 of the connecting link 100. As shown, the inner energy attenuator configuration may vary depending on the rear leg/connecting link interface.

Figures 6, 7:
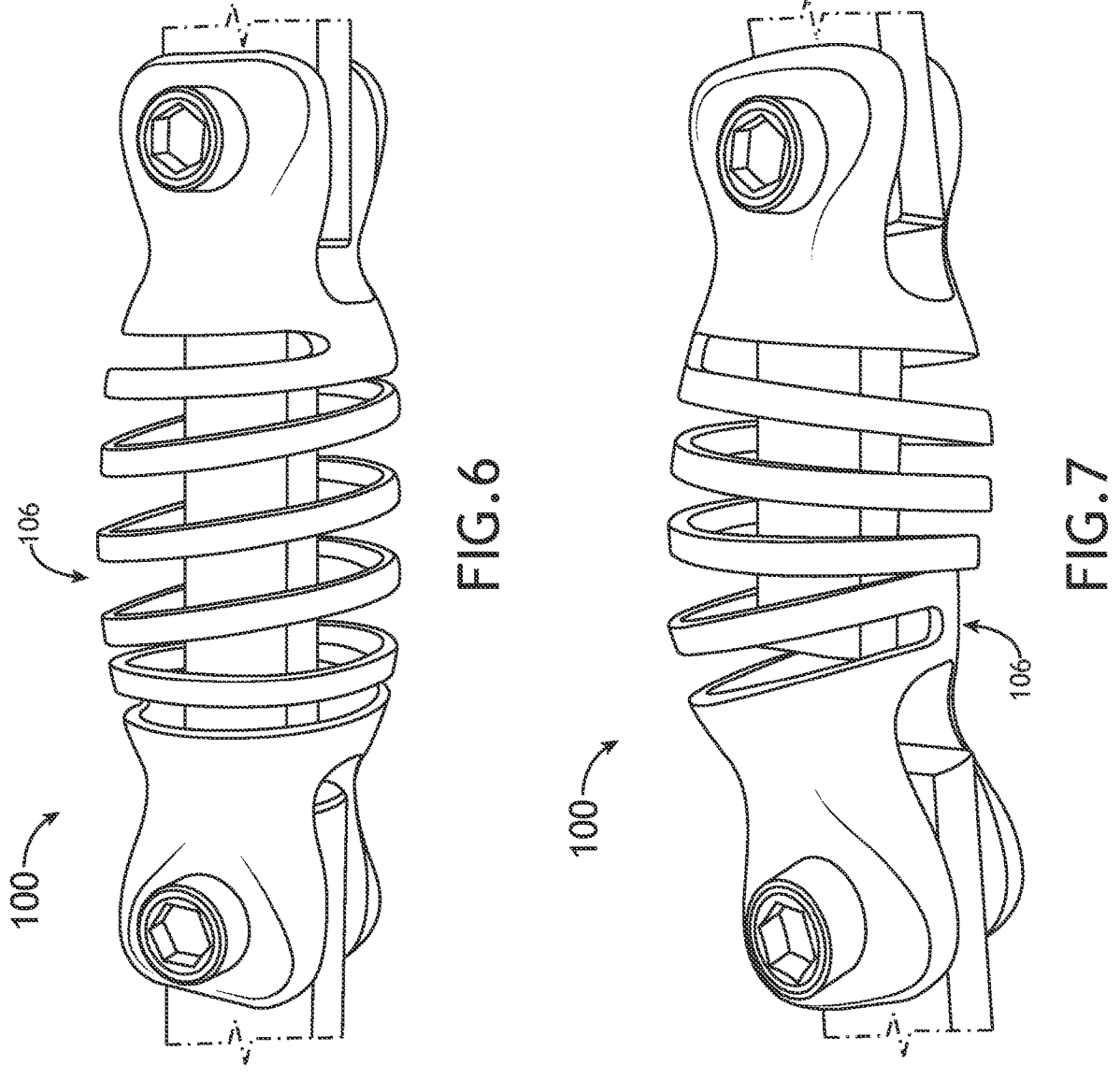
FIG. 6 shows connecting link elongation after subjecting the connecting link to threshold meeting tensive force.
FIG. 7 shows connecting link deformation after subjecting the connecting link to threshold meeting torsion force.
Figures 8A, 8B:
FIG. 8A shows a prior art aircraft seat platform.
FIG. 8B shows a detailed view of FIG. 8A.

FIGS. 6 and 7 illustrate the performance of the connecting link 100. In use, in the absence of force on the connecting link and/or on the attached components meeting a predetermined threshold force, the connecting link 100 acts as a rigid link interconnecting the first and second components. When a predetermined threshold force is met, the connecting link 100 undergoes plastic deformation (i.e., without recovery) in a predictable manner. For example, in the case of an aircraft, the impact force from a crash event will impart a force on the seat and/or floor that transmit through the seat leg and/or track fastener.

To attenuate the force on the attached components, the connecting link deforms according to the acting force. For example, the threshold force may correspond to a compressive threshold that when met causes the connecting link to compress. As shown in FIG. 6, the predetermined threshold may correspond to a tensive threshold that when met causes the connecting element, and particularly the helically shaped middle portion 106, to stretch or elongate. As shown in FIG. 7, the predetermined threshold may correspond to a torsion threshold that when met causes the connecting element, and particularly the helically shaped middle portion 106, to twist and/or bend from the torque acting on the link. Whereas the connecting link 100 has the ability to plastically deform in a predictable manner, conventional fixed doublers and components connected thereto tend to shear, particularly at the connecting joints.

As for the internal energy attenuator, such as the lattice structure and translation feature, the inbuilt lattice structure also acts as a rigid link until the predetermined threshold is reached. During a crash, for example, the lattice structure breaks due to the longitudinal load (e.g., 16 G) enabling a limited translatory (e.g., less than 2.5 cm) and rotatory movement (e.g., 10 Deg) in the connecting link. The degree of freedom of movement of the connecting link is preferably limited in order to limit occupant travel, thus ensuring occupant safety. In some embodiments, the lattice structure operates until the predetermined threshold is met, whereafter the translation feature and/or outer helix plastically deform during continued movement. When implemented as a seat leg assembly, this integrated approach reduces part count and assembly time, and in addition, enhances the existing floor warpage tolerance. Additive manufacturing processes enable the building of a functional assembly with the necessary clearances built in.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A connecting link, comprising:
   a housing having a first axial end portion attachable to a first component, a second axial end portion attachable to a second component, and a helically shaped middle portion extending from the first axial end portion to the second axial end portion and forming an interior space; and an energy attenuator positioned in the interior space, the energy attenuator comprising:

an inner cylindrical member extending axially from one end of the first axial end portion;

an outer cylindrical member extending axially from one end of the second axial end portion and circumferentially surrounding a portion of the first cylindrical member; and an annular lattice structure positioned between one end of the second cylindrical member and the first axial end portion and circumferentially surrounding a portion of the first cylindrical member;

wherein at least one of the helically shaped middle portion and the energy attenuator is configured to undergo plastic deformation when a threshold force on the connecting link is met.

2. The connecting link according to claim 1, wherein:

the annular lattice structure is configured to compress when a compressive threshold on the connecting link is met and break into at least two parts when a tensive threshold on the connecting link is met;

compression or breakage of the annular lattice structure causes relative movement between the first and second cylindrical members; and compression or breakage of the annular lattice structure causes deformation of the helically shaped middle portion.

3. The connecting link according to claim 1, wherein deformation of the helically shaped middle portion includes at least one of elongation, contraction, twisting and bending of the helically shaped middle portion.

4. The connecting link according to claim 1, wherein an axial passage is formed through the first cylindrical member.

5. The connecting link according to claim 1, wherein an interface between the inner and outer cylindrical members comprises an annular recess formed in the inner cylindrical member and an annular collar formed on the outer cylindrical member and engaged in the annular recess, wherein when a tensive threshold on the connecting link is met, the annular collar is configured to compress the inner cylindrical member radially inward.

6. The connecting link according to claim 1, wherein each of the first and second axial end portions is divided into two leg portions including aligned transverse openings.

7. The connecting link according to claim 1, wherein the energy attenuator comprises a rectangular cylindrical body configured to receive a portion of the second component.

8. The connecting link according to claim 1, manufactured by an additive manufacturing process.

9. An aircraft seat leg assembly, comprising:

a leg;

a track fastener; and a connecting link connecting the leg to the track fastener, the connecting link comprising:

a housing having a first axial end portion attached to the first component, a second axial end portion attached to the second component, and a helically shaped middle portion extending from the first axial end portion to the second axial end portion and forming an interior space; and an energy attenuator positioned in the interior space; wherein at least one of the helically shaped middle portion and the energy attenuator is configured to undergo plastic deformation when a threshold force on the connecting link is met.

10. The aircraft seat leg assembly according to claim 9, wherein the energy attenuator comprises:

an inner cylindrical member extending axially from one end of the first axial end portion;

an outer cylindrical member extending axially from one end of the second axial end portion and circumferentially surrounding a portion of the first cylindrical member; and an annular lattice structure positioned between one end of the second cylindrical member and the first axial end portion and circumferentially surrounding a portion of the first cylindrical member.

11. The aircraft seat leg assembly according to claim 10, wherein:

the annular lattice structure is configured to compress when a compressive threshold on the connecting link is met and break into at least two parts when a tensive threshold on the connecting link is met;

compression or breakage of the annular lattice structure causes relative movement between the first and second cylindrical members;

compression or breakage of the annular lattice structure causes deformation of the helically shaped middle portion; and deformation of the helically shaped middle portion includes at least one of elongation, contraction, twisting and bending of the helically shaped middle portion.

12. The aircraft seat leg assembly according to claim 11, wherein an interface between the inner and outer cylindrical members comprises an annular recess formed in the inner cylindrical member and an annular collar formed on the outer cylindrical member and engaged in the annular recess, wherein when a tensive threshold on the connecting link is met, the annular collar is configured to compress the inner cylindrical member radially inward.

13. The aircraft seat leg assembly according to claim 9, wherein each of the first and second axial end portions is divided into two leg portions including aligned transverse openings.

14. The aircraft seat leg assembly according to claim 9, wherein the energy attenuator comprises a rectangular cylindrical body configured to receive a tang extending from the leg.

15. A connecting link, comprising:

a housing having a first axial end portion attachable to a first component, a second axial end portion attachable to a second component, and a helically shaped middle portion extending from the first axial end portion to the second axial end portion and forming an interior space; and an energy attenuator positioned in the interior space, the energy attenuator comprising a rectangular cylindrical body configured to receive a portion of the second component;

wherein at least one of the helically shaped middle portion and the energy attenuator is configured to undergo plastic deformation when a threshold force on the connecting link is met.

16. The connecting link according to claim 15, wherein the energy attenuator comprises:

an inner cylindrical member extending axially from one end of the first axial end portion;

an outer cylindrical member extending axially from one end of the second axial end portion and circumferentially surrounding a portion of the first cylindrical member; and an annular lattice structure positioned between one end of the second cylindrical member and the first axial end portion and circumferentially surrounding a portion of the first cylindrical member.

17. The connecting link according to claim 16, wherein:

the annular lattice structure is configured to compress when a compressive threshold on the connecting link is met and break into at least two parts when a tensive threshold on the connecting link is met;

compression or breakage of the annular lattice structure causes relative movement between the first and second cylindrical members; and compression or breakage of the annular lattice structure causes deformation of the helically shaped middle portion.

18. The connecting link according to claim 16, wherein an axial passage is formed through the first cylindrical member.

19. The connecting link according to claim 15, wherein each of the first and second axial end portions is divided into two leg portions including aligned transverse openings.

* * * * *